April 30, 1968    T. W. ROWLAND ET AL    3,380,120

MANUFACTURE OF METAL CORED RUBBER ROLLS

Filed June 22, 1966      2 Sheets-Sheet 1

INVENTORS
THOMAS W. ROWLAND
CHARLES L. TAVELLE

*James and Franklin*

ATTORNEYS

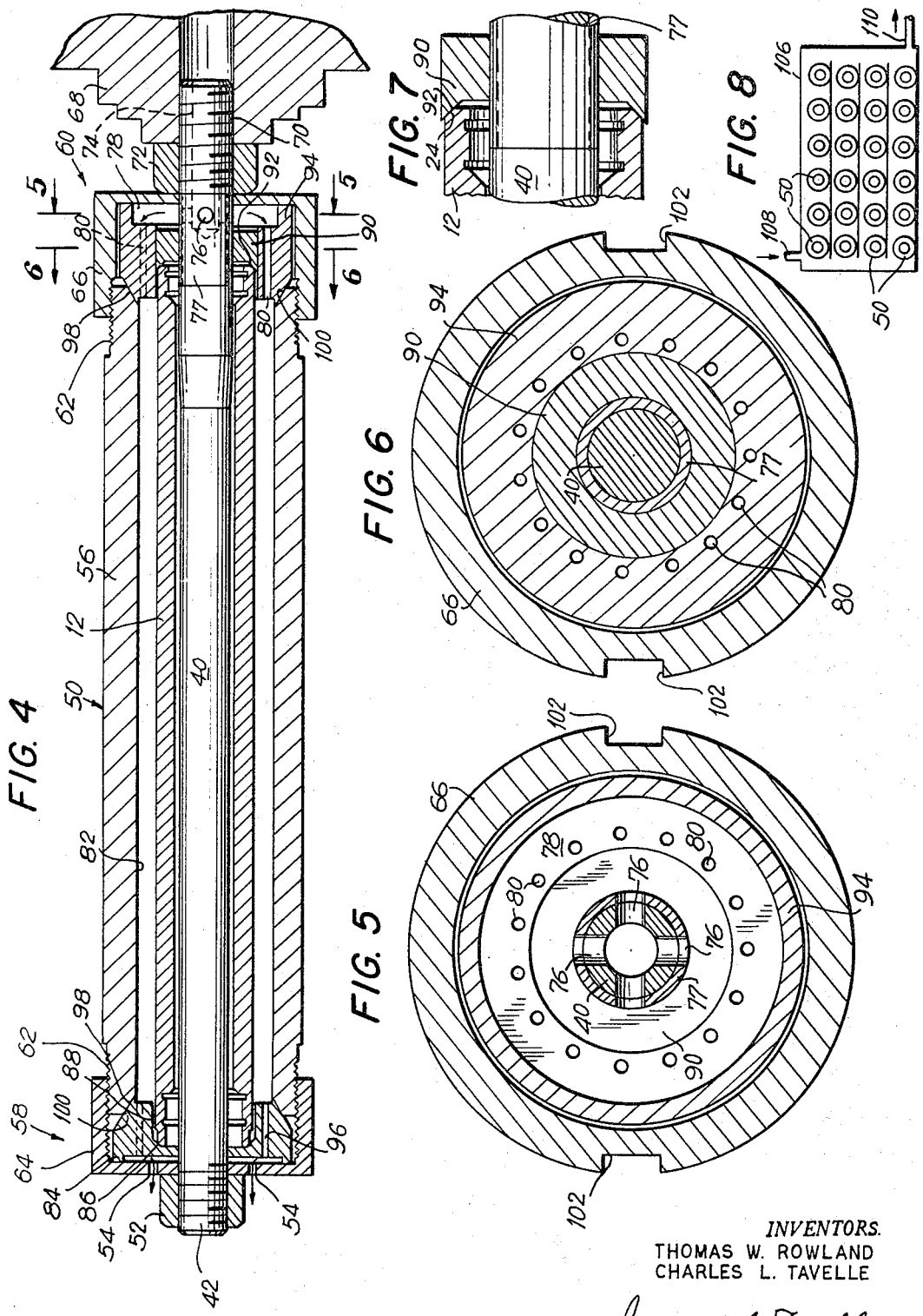

United States Patent Office 3,380,120
Patented Apr. 30, 1968

3,380,120
MANUFACTURE OF METAL CORED
RUBBER ROLLS
Thomas W. Rowland, Isle Palms, and Charles L. Tavelle, North Charleston, S.C., assignors to Raybestos-Manhattan Inc., Passaic, N.J., a corporation of New Jersey
Filed June 22, 1966, Ser. No. 559,586
8 Claims. (Cl. 18—30)

ABSTRACT OF THE DISCLOSURE

The apparatus is used for molding a metal cored rubber roll to very close tolerance. The mold comprises a cylindrical casing with removable end assemblies each having a taper to mate with the tapered ends of the core. One end assembly acts as an inlet, and has a ring which is axially slidable relative to the rest of the end assembly. This ring has the said taper mating with the core, and its outer face is exposed to the rubber being forced into the mold, so that it is pushed by the force of the supplied rubber to cause the tapers at both ends to center the core. The ends of the cylindrical casing also have tapers, and the end assemblies have mating tapers, that of the inlet end assembly being on an outer part which slidably receives the axially slidable ring. The ends of the casing are preferably threaded and receive internally threaded caps which bear against the end assemblies with a mechanical force, independently of the slidable ring. An extruder supplies the rubber under high pressure, and has a fixed spindle the remote end of which is threaded to receive a nut for securing the mold on the spindle. The core is hollow and slides over the spindle. The spindle has a counterbored inlet, and has radial holes for discharge of rubber from the counterbore into a hollow space in the inlet end assembly communicating with a ring or holes for passage of rubber into the mold cavity.

---

This invention relates to metal cored rubber rolls, and more particularly to the manufacture of such rolls made to precise dimension and concentricity.

There are many purposes for which a rubber surfaced roll is needed. The particular roll here discussed is a "fuser roll" used in a xerography copier. It runs against a heated rigid metal roll, and feeds the paper therebetween under considerable nip pressure and at a high temperature, say 360° F. at the metal roll, because it is at this point that the print is fused and embedded in the paper. It has been found desirable to employ a silicone rubber secured to the metal core by means of a silicone resin adhesive, and a thin sleeve of Teflon is secured over the rubber body by means of a similar adhesive. The rubber is rather thick, requiring a long time for "cure" or vulcanization because the rubber is a poor heat conductor.

It would be easy to employ a split mold, but it is found that the resulting orientation of the molecules of the rubber results in a variable nip pressure around the roll even after removing all flash and after grinding the roll to precise diameter.

It is therefore found better to employ a sleevelike mold into which the rubber is forced axially from one end to the other. This might be done by injection molding, but because the rubber requires a cure of say twenty or twenty-five minutes, compared to a preliminary filling time of say only one or two minutes, the expensive injection molding equipment would be tied up too long for each molding operation.

One object of the present invention is to overcome this difficulty, which is done by providing a large number of molds, together with means to facilitate attachment and detachment of a mold to an extruder, so that the extruder is used for the filling of the series of molds in rapid succession, a large number of these molds then being simultaneously cured in an appropriate autoclave.

Another object is to accurately center the metal core relative to the cylindrical mold casing, for which purpose tapers are employed between the core and the end assemblies supporting the same, and additional tapers are employed between the end assemblies and the casing. The force of the rubber being extruded into the mold is itself employed to provide axial pressure on the tapers engaging the core.

To accomplish the foregoing general objects, and other more specific objects which will hereinafter appear, our invention resides in the mold and extruder elements and their relation one to another, as are hereinafter more particularly described in the following specification. The specification is accompanied by drawings in which:

FIG. 4 is a longitudinal section through the mold and spindle;

FIG. 5 is a transverse section taken approximately on the line 5—5 of FIG. 4 and drawn to larger scale;

FIG. 6 is a transverse section taken approximately on the line 6—6 of FIG. 4;

FIG. 7 is a fragmentary view corresponding to a part at the right end of FIG. 4 but drawn to larger scale; and FIG. 8 is a schematic view representing the simultaneous cure of a large number of rubber rolls in filled molds.

Figure 1:
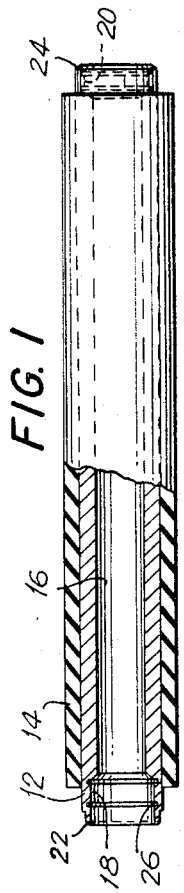
FIG. 1 shows one example of a metal cored rubber roll which is to be manufactured.

Referring to the drawing, and more particularly to FIG. 1, the fuser roll there illustrated comprises a metal core 12 carrying a rubber body 14. The latter is made of silicone rubber, and is molded directly around the metal core 12, preferably with a film of silicone resin adhesive therebetween, this being coated on the outside of the core 12 prior to the molding operation. The core 12 is hollow as indicated at 16, and the ends may be counterbored to somewhat larger diameter as shown at 18 and 20, to receive appropriate anti-friction bearings such as ball or roller bearings. These may be held in position axially, as by means of snap rings, received in annular grooves 26. It should be noted that for purposes of the present invention the ends of the core 12 have tapered corners indicated at 22 and 24. In the particular case here illustrated, the taper is at an angle of 45°, and it is provided for accurately centering the core in the mold as is explained later.

Figure 2:
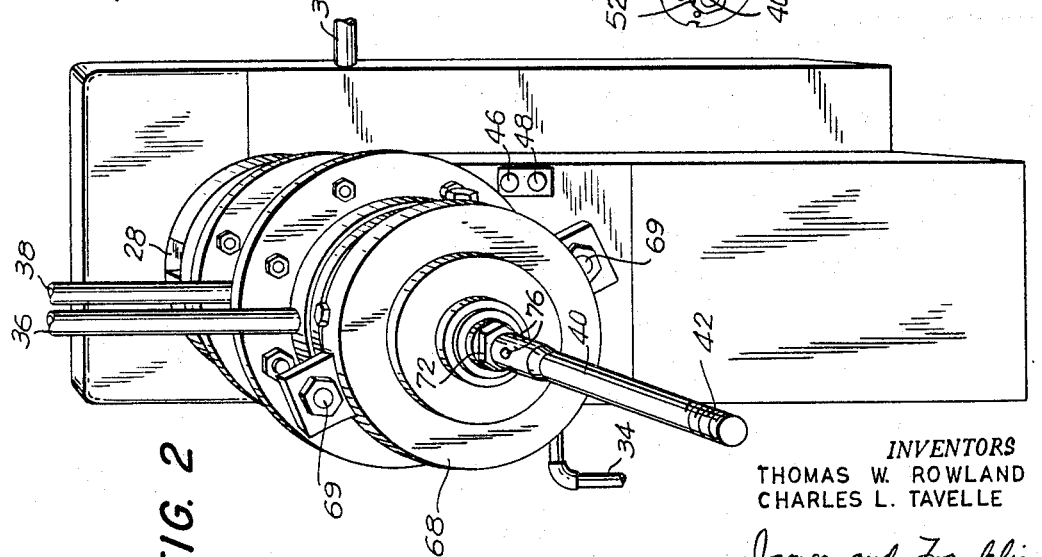
FIG. 2 is a perspective view of a screw-type extruder fitted with a spindle to detachably receive the molds which are to be filled.

Referring now to FIG. 2, the rubber is fed into the hopper opening 28 of a screw-type extruder generally designated 30. This may be a conventional extruder, driven by an electric motor through a shaft 32. The screw chamber is jacketed, and may be heated or cooled as required by means of hot or cold water, as is indicated by pipes such as those shown at 34, 36, 38.

In accordance with a feature of the present improvement, the extruder 30 is fitted with a spindle 40. This spindle remains with the extruder and serves to detachably receive and hold successive molds thereon, for which purpose the end of the spindle is threaded as shown at 42 to receive a holding nut.

Figure 3:
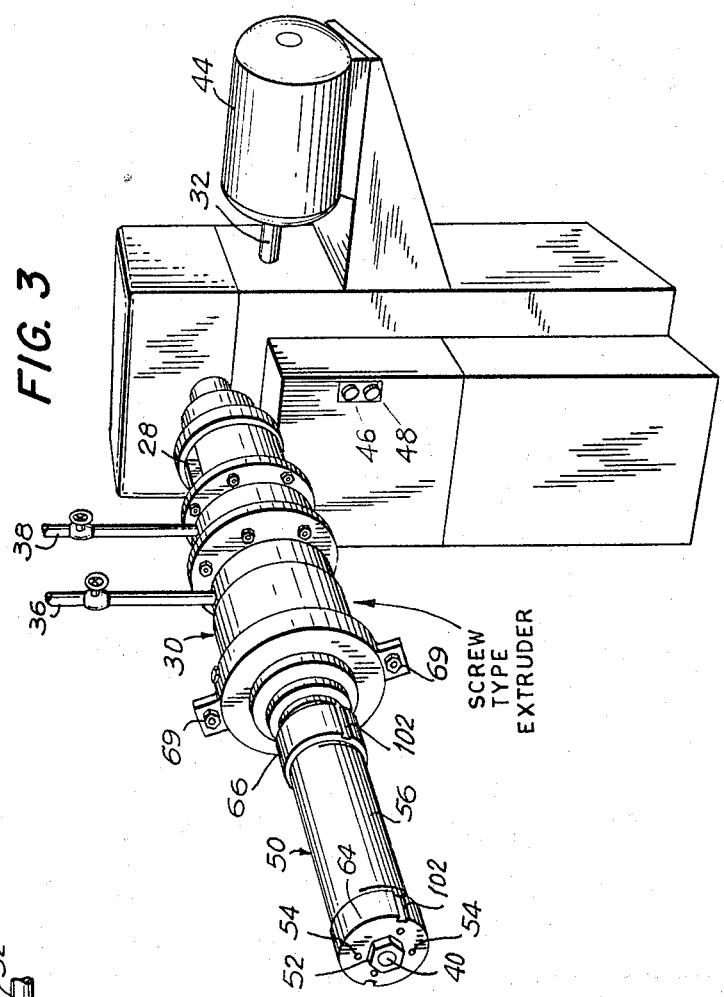
FIG. 3 is a perspective view showing the extruder with a mold mounted on the spindle.

FIG. 3 is another view of the extruder 30 with its pipes 36 and 38. This view shows the motor 44 which drives the shaft 32, and also shows readily accessible control means for starting and stopping the extruder, here represented by "start" and "stop" buttons 46 and 48. In FIG.

3 a mold generally designated 50 has been mounted on the extruder 30 by sliding the mold over the spindle 40 and adding a retainer nut 52. FIG. 3 also shows some small holes, in this case four holes 54, which serve for venting and for sight of rubber which begins to emerge at the holes when the mold has been filled.

Referring now to FIG. 4 of the drawing, the metal core 12 is mounted inside the mold 50, the latter comprising a cylindrical casing 56 with removable end assemblies generally designated 58 and 60. The end assemblies are secured on the casing 56, as by means of external threads 62 receiving internally threaded end caps 64 and 66. The discharge end of the extruder receives an adapter 68, which in turn receives one end 70 of the spindle 40. The spindle is secured to the adapter 68, as by threading the end 70 of the spindle, and the inside of the adapter 68, and the attachment may be locked by means of a lock nut 72. The remote or aft end of the spindle 40 is threaded at 42 to receive mounting nut 52 as previously described, it being understood that it is merely necessary to slide the core and mold assembly over the spindle 40, and to then apply the nut 52.

The inlet end 70 of the spindle 40 is counterbored at 74, and has radial holes 76 for discharge of rubber from the counterbore 74. The radial holes 76 are also shown in FIG. 2 and in FIG. 5, there being four such holes in the present case. The end assembly 60 (FIG. 4) has a hollow annular space 78 which is in axial registration with the radial holes 76. This space 78 communicates with a ring of small axially directed holes 80 (FIGS. 4 and 5) for passage of rubber being forced into the mold cavity 82 between the core 12 and the casing 56. In the present case there are fifteen holes each one-sixteenth inch in diameter, and located on a circle larger than the core 12 and smaller than the roll diameter, or differently expressed, smaller than the inside diameter of the casing 56.

It will be understood that the extruded rubber flows from the inlet end 60 toward the remote end 58, during which time the small holes 54 act as vent holes. Finally when rubber emerges through the holes 54 the operator knows that the mold has been filled, whereupon he stops the extruder; removes the mold; and replaces it with another. The small diameter of the holes in the mold necessitates a very high pressure from the extruder, but has the advantage of retaining the charge of rubber under considerable pressure during the subsequent curing of the rubber after the mold has been removed from the extruder.

An important feature of the present improvement is the provision of means for accurately centering the core relative to the rubber. Referring to FIG. 4, the end assembly 58 comprises a centering piece 84 which is separate from although surrounded by the end cap 64. The centering piece 84 has an internal taper at 86 which mates with the end taper 22 of the core, best shown in FIG. 1. The deep recess 88 (FIG. 4) in centering piece 84 receives the end of the core 12 with a slight radial clearance, in order to afford a slight radial adjustment at the taper 86. The clearance may be as little as 0.005" and yet affords some centering on the taper.

A similar tapered relation is provided at the inlet end assembly 60, and referring to FIG. 7, a ring 90 has an internal taper 92 to mate with the end taper 24 of the core 12. In this figure the radial clearance has been exaggerated for clarity. The inlet end assembly 60 (FIG. 4) differs from the remote end assembly 58 in having the said ring 90 which is axially slidable in the main centering piece 94. As will be understood from inspection of FIG. 4, the ring 90 is pushed inward by the force of the rubber in the annular space 78, and this provides the necessary axial force to cause the internal tapers 86 and 92 at both ends to center the core 12, relative to the centering pieces 84 and 94. The spindle may be provided with replaceable or renewable bearing metal which is poured into position at 77, to take any wear resulting from the action of the ring 90.

The centering piece 84 preferably has a ring of small holes 96, like the holes 80 in centering piece 94. There is considerable pressure in space 78 to insure an axial force on ring 90.

Additional means are provided to center the centering pieces 84 and 94 relative to the casing 56, and referring to FIG. 4 it will be seen that the ends of the casing wall 56 are internally tapered as shown at 98. In this case the taper is 30°. The centering pieces 84 and 94 are externally tapered at 100 with a similar 30° taper in order to mate with the taper 98. The centering piece 84 has clearance therearound for a radial self-adjustment within the cap 64. The centering piece 94 similarly has at least some clearance for radial self-adjustment.

It will be understood with this construction that tightening of the threaded caps 64 and 66 centers the end pieces 84 and 94 relative to the casing 56. These in turn center the core 12, relative to the centering pieces 84 and 94, as was previously explained. The caps 64 and 66 may have appropriate slots 102 to receive a spanner wrench for tightening the same when assembling the mold, and for unscrewing the same when opening the mold for removal of the roll therein.

FIG. 8 schematically represents a steam autoclave 106, this being arranged to simultaneously receive a large number of charged molds 50, each like that described above. The pipes 108 and 110 symbolically represent steam supply and discharge pipes. The steam may be in direct contact with the molds. The rubber is cured for a period of say twenty to twenty-five minutes at a temperature in a range of say 300° F. to 340° F. and preferably 320° F. The rubber is relatively soft, it having in this particular case, a Shore A Durometer of 35 plus or minus 5.

The roll shown in FIG. 1 may later have added to it a thin Teflon sleeve, adhesively secured thereto. Other changes may be made. However, FIG. 1 illustrates the roll as it is molded by the present process.

The parts of the mold are made of steel, and the centering pieces 84 and 94 and the ring 90 are preferably made of a hard tool steel in order to maintain their accuracy. The surfaces of the mold which come in contact with the rubber, particularly the inside wall of the casing 56, is preferably Teflon coated for easy release of the molded roll.

It is believed that the construction and method of use of the improved mold, and its mechanical cooperation with a screw-type extruder, as well as the advantages thereof, will be apparent from the foregoing detailed description. It will also be apparent that while we have shown and described the improvement in a preferred form, changes may be made without departing from the scope of the invention, as sought to be defined in the following claims.

We claim:

1. A mold for molding a metal cored rubber roll to close tolerance, the ends of said metal core being tapered, said mold comprising a cylindrical casing with removable end assemblies, means to secure the end assemblies on the casing, one end assembly having a taper to mate with the taper at one end of the core, and the other end assembly having a taper to mate with the taper at its end of the core, one end assembly acting as an inlet and having holes for passage of rubber being forced into the mold cavity between the core and the casing and moving toward the remote end assembly, and said inlet end assembly having a ring which is axially slidable relative to the rest of said end assembly and which carries the taper to mate with the adjacent taper of the core, the outer face of said slidable ring being exposed to the rubber being forced into the mold, whereby said slidable ring is pushed by the force of the supplied rubber and causes the tapers at both ends to center the core.

2. A mold as defined in claim 1 in which the ends of the cylindrical casing have tapers, and the end assemblies each have a taper mating with the taper of the casing, the inlet end assembly having an outer part with a cylindrical inner surface which slidably receives the axially slidable ring, said slidable ring having a mating cylindrical outer surface, and means to urge the outer part of the inlet end assembly toward the remote end assembly independently of the force exerted by the rubber on the aforesaid axially slidable ring.

3. A mold as defined in claim 2, in which the ends of the casing are externally threaded, and in which there is an internally threaded cap screwed on to each end of the casing and bearing axially against an end assembly, and in which each end assembly has holes for passage of rubber therethrough, and in which the cap which is remote from the inlet end has holes for venting and for sight of rubber, and in which the cap at the inlet end bears against the outer part of the inlet end assembly to urge it toward the remote end.

4. A mold as defined in claim 2, in which the core is hollow, the inlet end assembly has a ring of holes on a circle larger than the core outer diameter and smaller than the roll diameter for passage of rubber into the mold cavity, the remote end assembly has some small holes for venting and for sight of rubber when the mold has been filled, an extruder for extruding rubber under high pressure into the inlet end of the mold, means to readily stop the extruder when the mold has been filled, a spindle secured to the extruder, the remote end of the spindle being threaded to receive a nut for securing the mold on the spindle, the end assemblies and core being dimensioned to slide freely over the spindle, said spindle having a counterbored inlet end and having radial holes for discharge of rubber from the counterbore, the inlet end assembly having a hollow annular space in axial registration with the radial holes of the spindle and communicating with the ring of holes for passage of rubber into the mold cavity.

5. A mold as defined in claim 1, in which the ends of the casing are externally threaded, and in which there is an internally threaded cap screwed onto each end of the casing and bearing axially against an end assembly, and in which each end assembly has holes for passage of rubber therethrough, and in which the cap which is remote from the inlet end has holes for venting and for sight of rubber.

6. A mold as defined in claim 1, in which the core is hollow, the inlet end assembly has a ring of holes on a circle larger than the core outer diameter and smaller than the roll diameter for passage of rubber into the mold cavity, the remote end assembly has some small holes for venting and for sight of rubber when the mold has been filled, an extruder for extruding rubber under high pressure into the inlet end of the mold, means to readily stop the extruder when the mold has been filled, a spindle secured to the extruder, the remote end of the spindle being threaded to receive a nut for securing the mold on the spindle, the end assemblies and core being dimensioned to slide freely over the spindle, said spindle having a counterbored inlet end and having radial holes for discharge of rubber from the counterbore, the inlet end assembly having a hollow annular space in axial registration with the radial holes of the spindle and communicating with the ring of holes for passage of rubber into the mold cavity.

7. A mold for molding a metal cored rubber roll to close tolerance, said core being hollow, the ends of said core having tapered corners, said mold comprising cylindrical casing with removable end assemblies, means to secure the end assemblies on the casing, one end assembly having an internal taper to mate with the tapered corner at one end of the core, and the other end assembly having an internal taper to mate with the tapered corner at its end of the core, one end assembly acting as an inlet and having a ring of holes for passage of rubber being forced into the mold cavity between the core and the casing and moving toward the remote end assembly, the remote end assembly having some small holes for venting and for sight of rubber when the mold has been filled, a screw-type extruder for extruding rubber under high pressure into the inlet end of the mold, means to readily stop the extruder when the mold has been filled, a spindle secured to the extruder, the remote end of the spindle being threaded to receive a nut for securing the mold on the spindle, the end assemblies and core being dimensioned to slide freely over the spindle, said spindle having a counterbored inlet end and having radial holes for discharge of rubber from the counterbore, the inlet end assembly having a hollow annular space in axial registration with the radial holes of the spindle and communicating with the aforesaid ring of holes for passage of rubber into the mold cavity.

8. A mold as defined in claim 7, in which the ends of the cylindrical casing have an internal taper, the end assemblies each having an external taper mating with the taper of the casing, the inlet end assembly having an outer part with a cylindrical inner surface which slidably receives an axially slidable ring which has the internal taper for the core, said slidable ring having a mating cylindrical outer surface, and means to urge the outer part of the inlet end assembly toward the remote end assembly independently of the force exerted by the supply of rubber on the aforesaid axially slidable ring.

References Cited

UNITED STATES PATENTS

| | | | |
|---|---|---|---|
| 1,316,992 | 9/1919 | Wolever | 18—29 |
| 1,457,292 | 5/1923 | Schroeder | 18—29 XR |
| 1,745,482 | 2/1930 | Goodwin | 18—30 |
| 2,346,640 | 4/1944 | Anthony | 18—36 XR |
| 2,770,012 | 11/1956 | Bowerman | 18—36 XR |
| 2,880,460 | 4/1959 | Monett | 18—30 |
| 3,196,485 | 7/1965 | Battenfeld et al. | |
| 3,207,833 | 9/1965 | D'Errico. | |
| 3,263,275 | 8/1966 | McElroy | 18—26 |
| 3,315,315 | 4/1967 | Triulzi. | |

WILLIAM J. STEPHENSON, *Primary Examiner.*